(12) United States Patent
Lorenz et al.

(10) Patent No.: US 8,519,030 B2
(45) Date of Patent: Aug. 27, 2013

(54) COPOLYMER COMPRISING POLYETHER SIDE CHAINS AND HYDROXYALKYL AND ACID STRUCTURAL UNITS

(75) Inventors: Klaus Lorenz, Zangberg (DE); Gerhard Albrecht, Prien am Chiemsee (DE); Silke Flakus, Ebersberg (DE); Alexander Kraus, Evenhausen (DE); Helmut Mack, Traunstein (DE); Petra Wagner, Trostberg (DE); Christian Scholz, Wald an der Alz (DE); Barbara Wimmer, Tacherting (DE); Angelika Hartl, Emertsham (DE); Martin Winklbauer, Halsbach (DE)

(73) Assignee: Construction Research & Technology GmbH, Trostberg (DE)

( * ) Notice: Subject to any disclaimer, the term of this patent is extended or adjusted under 35 U.S.C. 154(b) by 23 days.

(21) Appl. No.: 12/866,998

(22) PCT Filed: Jan. 12, 2009

(86) PCT No.: PCT/EP2009/050261
§ 371 (c)(1),
(2), (4) Date: Oct. 22, 2010

(87) PCT Pub. No.: WO2009/100957
PCT Pub. Date: Aug. 20, 2009

(65) Prior Publication Data
US 2011/0054083 A1      Mar. 3, 2011

(30) Foreign Application Priority Data

Feb. 13, 2008   (EP) .................................. 08101595

(51) Int. Cl.
C08F 220/06   (2006.01)
C08L 31/02    (2006.01)
C04B 16/04    (2006.01)

(52) U.S. Cl.
USPC ........................... 524/5; 524/558; 526/318.42

(58) Field of Classification Search
USPC ................................. 524/5, 558; 526/318.42
See application file for complete search history.

(56) References Cited

U.S. PATENT DOCUMENTS

| | | | |
|---|---|---|---|
| 2,164,871 A | 7/1939 | Eichenlaub | |
| 4,888,059 A | 12/1989 | Yamaguchi et al. | |
| 4,968,734 A | 11/1990 | Gaidis et al. | |
| 5,081,111 A | 1/1992 | Akimoto et al. | |
| 5,162,402 A | 11/1992 | Ogawa et al. | |
| 5,320,837 A | 6/1994 | Akimoto et al. | |
| 5,350,450 A | 9/1994 | Hamabe et al. | |
| 5,358,566 A | 10/1994 | Tanaka et al. | |
| 5,362,323 A | 11/1994 | Koyata et al. | |
| 5,362,324 A | 11/1994 | Cerulli et al. | |
| 5,369,198 A | 11/1994 | Albrecht et al. | |
| 5,432,212 A | 7/1995 | Honda et al. | |
| 5,634,966 A | 6/1997 | Berke et al. | |
| 5,661,206 A | 8/1997 | Tanaka et al. | |
| 5,665,158 A | 9/1997 | Darwin et al. | |
| 5,703,174 A | 12/1997 | Arfaei et al. | |
| 5,725,657 A | 3/1998 | Darwin et al. | |
| 5,798,425 A | 8/1998 | Albrecht et al. | |
| 5,834,576 A | 11/1998 | Nagano et al. | |
| 5,840,114 A | 11/1998 | Jeknavorian et al. | |
| 5,911,820 A | 6/1999 | Satoh et al. | |
| 5,912,284 A | 6/1999 | Hirata et al. | |
| 5,925,184 A | 7/1999 | Hirata et al. | |
| 6,077,910 A | 6/2000 | Ikuta et al. | |
| 6,165,262 A | 12/2000 | Kono et al. | |
| 6,166,112 A | 12/2000 | Hirata et al. | |
| 6,187,841 B1 | 2/2001 | Tanaka et al. | |
| 6,211,317 B1 | 4/2001 | Albrecht et al. | |
| 6,214,958 B1 | 4/2001 | Le-Khac et al. | |
| 6,294,015 B1 | 9/2001 | Yamashita et al. | |
| 6,376,581 B1 | 4/2002 | Tanaka et al. | |
| 6,384,111 B1 | 5/2002 | Kistenmacher et al. | |
| 6,387,173 B2 | 5/2002 | Greenwood et al. | |
| 6,387,176 B1 | 5/2002 | Widmer et al. | |
| 6,391,923 B1 | 5/2002 | Pöllmann et al. | |
| 6,437,027 B1 | 8/2002 | Isomura et al. | |
| 6,486,260 B1 | 11/2002 | Yuasa et al. | |
| 6,653,441 B2 | 11/2003 | Harre et al. | |
| 6,680,348 B1 | 1/2004 | Amaya et al. | |
| 6,712,900 B2 | 3/2004 | Wombacher et al. | |
| 6,727,315 B2 | 4/2004 | Yamamoto et al. | |
| 6,762,220 B1 | 7/2004 | Yaguchi et al. | |
| 6,777,517 B1 | 8/2004 | Albrecht et al. | |
| 6,815,513 B2 | 11/2004 | Le-Khac et al. | |
| 6,855,752 B2 | 2/2005 | Velten et al. | |
| 6,864,337 B2 | 3/2005 | Yuasa et al. | |
| 6,911,494 B2 | 6/2005 | Yamashita et al. | |
| 7,026,402 B2 | 4/2006 | Schober et al. | |
| 7,125,944 B2 | 10/2006 | Yamashita et al. | |
| 7,375,163 B2 | 5/2008 | Schober et al. | |
| 7,405,264 B2 | 7/2008 | Yuasa et al. | |
| 7,425,596 B2 | 9/2008 | Kraus et al. | |
| 7,482,405 B2 | 1/2009 | Matsumoto et al. | |
| 2002/0103290 A1 | 8/2002 | Pollmann et al. | |
| 2002/0193547 A1 | 12/2002 | Yuasa et al. | |
| 2003/0125492 A1* | 7/2003 | Yamamoto et al. | 526/318.2 |
| 2003/0209695 A1 | 11/2003 | Tsuzuki et al. | |

(Continued)

FOREIGN PATENT DOCUMENTS

DE    103 37 975 A1    4/2005
EP     0537870 A1      4/1993

(Continued)

OTHER PUBLICATIONS

STN Structure Search (Jun. 25, 2012).*
Abstract of KR 2004100817 A; B. M. Kim, Dec. 2004.

*Primary Examiner* — Vu A Nguyen
(74) *Attorney, Agent, or Firm* — Curatolo Sidoti Co., LPA; Joseph G. Curatolo; Salvatore A. Sidoti

(57) ABSTRACT

The invention relates to a copolymer which is suitable as a superplasticizer for hydraulic binders and comprises 5 to 55 mol % of an isoprenol polyether derivative structural unit, 2 to 90 mol % of an acrylic acid derivative structural unit and 2 to 90 mol % of a hydroxyalkyl acrylate structural unit.

16 Claims, No Drawings

(56) References Cited

U.S. PATENT DOCUMENTS

| | | |
|---|---|---|
| 2004/0204517 A1 | 10/2004 | Yamashita et al. |
| 2005/0171325 A1 | 8/2005 | Matsui et al. |
| 2006/0004148 A1 | 1/2006 | Sulser et al. |
| 2006/0100355 A1 | 5/2006 | Waser et al. |
| 2006/0111478 A1 | 5/2006 | Hommer et al. |
| 2006/0183820 A1 | 8/2006 | Asano et al. |
| 2006/0247402 A1 | 11/2006 | Matsumoto et al. |
| 2006/0281885 A1 | 12/2006 | Bichler et al. |
| 2006/0281886 A1 | 12/2006 | Bichler et al. |
| 2007/0039515 A1 | 2/2007 | Bandoh et al. |
| 2007/0043190 A1 | 2/2007 | Kraus et al. |
| 2007/0073022 A1 | 3/2007 | Yuasa et al. |
| 2007/0161724 A1 | 7/2007 | Moraru et al. |
| 2007/0181039 A1 | 8/2007 | Yamamoto et al. |
| 2007/0255032 A1 | 11/2007 | Bichler et al. |
| 2008/0017078 A1 | 1/2008 | Bichler et al. |
| 2008/0295741 A1 | 12/2008 | Jeknavorian et al. |
| 2008/0300343 A1 | 12/2008 | Becker et al. |
| 2009/0163622 A1 | 6/2009 | Albrecht et al. |
| 2009/0234046 A1 | 9/2009 | Izumi et al. |
| 2009/0312460 A1 | 12/2009 | Lorenz et al. |
| 2009/0312504 A1 | 12/2009 | Lorenz et al. |

FOREIGN PATENT DOCUMENTS

| | | |
|---|---|---|
| EP | 1016638 A2 | 7/2000 |
| EP | 1061089 B1 | 3/2004 |
| EP | 1218427 B1 | 10/2005 |
| EP | 1655272 A1 | 5/2006 |
| EP | 2090553 A1 | 8/2009 |
| EP | 2090596 A1 | 8/2009 |
| EP | 2090597 A1 | 8/2009 |
| EP | 2090599 A1 | 8/2009 |
| EP | 2113519 A1 | 11/2009 |
| JP | 59-162160 | 9/1984 |
| JP | 2002/179449 | 6/2002 |
| JP | 2005/330129 | 12/2005 |
| WO | WO 2005/075529 A2 | 8/2005 |
| WO | WO 2006/133933 A2 | 12/2006 |

\* cited by examiner

COPOLYMER COMPRISING POLYETHER SIDE CHAINS AND HYDROXYALKYL AND ACID STRUCTURAL UNITS

CROSS REFERENCE TO RELATED APPLICATIONS

This application is a national stage application of International Application No. PCT/EP2009/050261, filed 12 Jan. 2009, which claims priority from European Patent Application Serial No. 08 101 595.0, filed 13 Feb. 2008, from which applications priority is claimed, and which are incorporated herein by reference.

The present invention relates to a copolymer, the preparation of the copolymer and a building material mixture.

It is known that admixtures in the form of dispersants are often added to aqueous slurries of pulverulent inorganic or organic substances, such as clays, silicate powder, chalk, carbon black, crushed rock and hydraulic binders, for improving their processability, i.e. kneadability, spreadability, sprayability, pumpability or flowability. Such admixtures are capable of preventing the formation of solid agglomerates, dispersing already present particles and particles newly formed by hydration and in this way improving the processability. This effect is also utilized in a targeted manner in particular in the production of building material mixtures which contain hydraulic binders, such as cement, lime, gypsum, hemihydrate or anhydrite.

In order to convert these building material mixtures based on said binders into a ready-to-use, processable form, as a rule substantially more mixing water is required than would be necessary for the subsequent hydration or hardening process. The proportion of cavities which are formed by the excess, subsequently evaporating water in the concrete body leads to significantly poorer mechanical strengths and stabilities.

In order to reduce this excess proportion of water at a specified processing consistency and/or to improve the processability at a specified water/binder ratio, admixtures that are generally referred to as water-reducing agents or superplasticizers are used. Agents of this type which are used in practice are in particular copolymers which are prepared by free radical copolymerization of acid monomers and/or acid derivative monomers with polyether macromonomers.

WO 20051075529 describes copolymers which, in addition to acid monomer structural units, have vinyloxybutylenepoly(ethylene glycol) structural units as polyether macromonomer structural units. Such copolymer types are widely used as high-performance superplasticizers since they have excellent performance characteristics. In this context, the robustness or universality with regard to the use of different cements, different mixing procedures and different temperatures of use should be particularly singled out. The concrete containing these high-performance superplasticizers is usually distinguished by particularly good processability.

The vinyloxybutylenepoly(ethylene glycol) used as a monomeric precursor of these copolymers is obtained by ethoxylation of 4-hydroxybutyl vinyl ether. 4-Hydroxybutyl vinyl ether is an industrial secondary product of acetylene. Owing to the fact that the chemistry based on acetylene (Reppe chemistry) has been very substantially replaced by the chemistry based on ethylene, the industrial production of 4-hydroxybutyl vinyl ether is associated with the few industrial locations still operating Reppe chemistry. It can also usually be assumed that 4-hydroxybutyl vinyl ether cannot or will not be able to be particularly economically prepared as a product of the Reppe chemistry, which is complicated particularly in point of view of safety. The abovementioned accordingly also affects the availability and the costs of vinyloxybutylenepoly(ethylene glycol) and the corresponding copolymers.

The object of the present invention is therefore to provide an economical dispersant for hydraulic binders which is particularly suitable as a superplasticizer/water-reducing agent for concrete.

This object is achieved by a copolymer comprising i) 5 to 55 mol % of an isoprenol polyether derivative structural unit α, ii) 2 to 90 mol % of an acrylic acid derivative structural unit β and iii) 2 to 90 mol % of a hydroxyalkyl acrylate structural unit γ, the isoprenol polyether derivative structural unit α being represented by the following general formula (Ia)

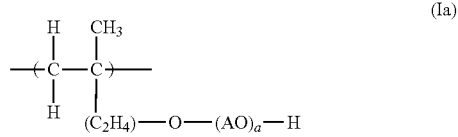

where

A is identical or different and is represented by an alkylene group according to $C_xH_{2x}$ where x=2, 3, 4 or 5, a is identical or different and is represented by an integer between 5 and 45, the acrylic acid derivative structural unit β being represented by the following general formulae (IIa) and/or (IIb)

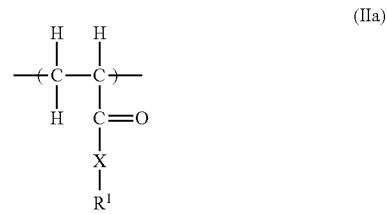

where

X is identical or different and is represented by NH—$(C_nH_{2n})$ where n=1, 2, 3 or 4 or represented by O—$(C_nH_{2n})$ where n=1, 2, 3 or 4;

$R^1$ is identical or different and is represented by $SO_3H$, $PO_3H_2$, $OPO_3H_2$ and/or $C_6H_5$—$SO_3H$

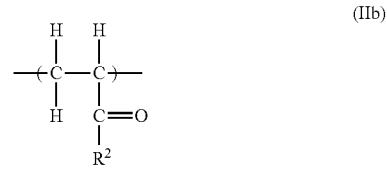

where $R^2$ is identical or different and is represented by OH, OM where M=Na, K, Ca and/or $ONH_4$ and the hydroxyalkyl acrylate structural unit γ being represented by the following general formula (III)

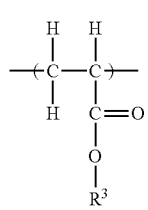

(III)

where
R³ is identical or different and is represented by a branched or straight-chain $C_1$-$C_5$ monohydroxyalkyl group.

The determination of a (number of alkoxy groups) in the isoprenol polyether derivative structural unit α according to the general formula (Ia) is effected on the basis of so-called MALDI-TOF-MS measurements (MALDI-TOF-MS is an abbreviation for Matrix Assisted Laser Desorption/Ionization Time Of Flight Mass Spectroscopy). The MALDI-TOF-MS measurements carried out in this context were carried out on a "Bruker Reflex III", equipped with a 337 nm nitrogen laser. The acceleration voltage was 20 kV and the detection of the cation spectra was effected in the reflector mode.
Dihydroxybenzoic acid (DHB) was used as a matrix and potassium chloride from Merck KGaA as the salt. The sample was prepared as a solid. For this purpose, in each case a pinch of the corresponding sample was dissolved in THF. A small part of the dissolved sample was then triturated with a pinch of DHB and a pinch of potassium chloride in a mortar. A part of this mixture was applied to a sample target by means of a spatula. The calibration was effected with an external standard which was composed of the following peptides (Pepmix): 10 pm/μl of Bradikinin, 10 pm/μl of Angiotensin I, 10 pm/μl of Angiotensin II, 10 pm/μl of Neurotensin and 10 pm/μl of ACTH. The peptides were dissolved in a mixture of 20% by weight of acetonitrile, 79.9% by weight of $H_2O$ and 0.1% by weight of formic acid. The Pepmix is additionally diluted with $H_2O$. For the calibration, 1 μl of Pepmix was mixed with 1 μl of DHB solution on a spot of the target. A methanol-water mixture in the ratio 1:1 was used as the solvent for the DHB solution. The concentration was 10 mg/ml.

The isoprenol polyether derivative structural unit α is decisively involved in the dispersing effect of the copolymer. The precursor of the corresponding monomeric starting compound is isoprenol (3-methyl-3-buten-1-ol). Isoprenol is a product of olefinic chemistry, which is obtained, for example, in large amounts as an intermediate in the citral synthesis. In general, it may be said that isoprenol may be regarded as an economical intermediate of the chemical industry which is available in large amounts. This means that the copolymers according to the invention which are based on alkoxylated isoprenol are correspondingly highly attractive economically. Also important is that the copolymers according to the invention have the excellent performance characteristics of the high-performance superplasticizers which are described above.

Finally, regarding the preparation of the copolymer (polymerization process), it should be mentioned that alkoxylated isoprenol is easier to handle in terms of process engineering, owing to the particularly high resistance to acidic hydrolysis compared with vinyloxybutylenepoly(ethylene glycol).

In the general formula (Ia) representing the isoprenol polyether derivative structural unit α, x is generally represented by 2 and/or 3, preferably 2. Ethoxy groups or mixtures of ethoxy and propoxy groups are therefore typical.

In the general formula (Ia) representing the isoprenol polyether derivative structural unit α, a=6 to 15 preferably for at least 20 mol %, particularly preferably for at least 35 mol %, of all $(AO)_a$ side chain segments and a=19 to 35 preferably for a further at least 20 mol %, particularly preferably for a further at least 35 mol %, of all $(AO)_a$ side chain segments. This can be achieved by using two different types of isoprenol polyether derivative monomers in the copolymerization. One type then has, for example, a frequency-average value with regard to a of 11 and the other type accordingly of about 24. This mixture of longer and shorter polyether side chains in the copolymer increases the performance thereof.

The isoprenol polyether derivative structural unit α is preferably present in a relative proportion of 25 to 50 mol %, particularly preferably 30 to 45 mol %. As a rule, the acrylic acid derivative structural unit β is present in a relative proportion of 35 to 60 mol %, particularly preferably 40 to 55 mol %. The hydroxyalkyl acrylate structural unit γ is preferably present in a relative proportion of 2 to 30 mol %, particularly preferably 6 to 23 mol %.

In general, the acrylic acid derivative structural unit β is represented by the general formula (IIb). R² is then usually represented by OH. Acrylic acid is therefore preferably used as the monomer producing the acrylic acid derivative structural unit β.

In a preferred embodiment, in the hydroxyalkyl acrylate structural unit γ which is represented by the general formula (III), R³ is represented by —$CH_2$—CHOH—$CH_3$, —$CHCH_3$—$CH_2$—OH and/or —$CH_2$—$CH_2$—OH.

Frequently, the copolymer according to the invention has a weight average molecular weight of 10 000 to 100 000.

As a rule, the copolymer according to the invention is present in aqueous solution which contains 30 to 95% by weight of water and 5 to 70% by weight of dissolved dry matter. The dry matter then usually substantially comprises the anhydrous copolymer.

In addition to the isoprenol polyether derivative structural unit α, the acrylic acid derivative structural unit β and the hydroxyalkyl acrylate structural unit γ, the copolymer according to the invention may also have at least one further structural unit. In such a case, the copolymer may have at least 1 mol % of an isoprenol structural unit α', which is represented by the general formula (IVa)

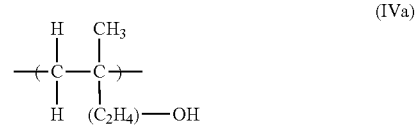

(IVa)

By incorporating the isoprenol structural unit α' in the form of polymerized units, the side chain density and hence the performance characteristics of the copolymer can be modified.

The invention also relates to the preparation of the copolymer according to the invention by free radical solution polymerization at 0 to 40° C. in the presence of a redox initiator, water being used as a solvent. However, the copolymer according to the invention can also be prepared by any other process.

The present invention also relates to a building material mixture containing copolymer according to the invention and a hydraulic binder and/or a latently hydraulic binder. Typically, the hydraulic binder is present as cement, lime, gypsum, hemihydrate or anhydrite or as mixtures of these components, but preferably as cement. The latently hydraulic binder is usually present as fly ash, trass or a blast furnace slag.

The present invention is to be described in more detail below with reference to working examples.

Copolymers according to the invention (according to Preparation Examples 1 and 2) are to be compared with copolymers which are already successfully used in practice (according to Comparative Examples 1 and 2) with regard to the performance thereof.

PREPARATION EXAMPLE 1

(Ex. 1)—Copolymer Type 1 According to the Invention

A glass reactor equipped with a plurality of feed possibilities, stirrer and dropping funnel was loaded with 87 ml of water, 37.5 g of macromonomer 1 (prepared by ethoxylation of 3-methyl-3-buten-1-ol with 11 mol of EO) and 82.5 g of macromonomer 2 (prepared by ethoxylation of 3-methyl-3-buten-1-ol with 22 mol of EO) (solution A) and thermostatted at 16° C. A portion of a second prepared, partly neutralized solution (solution B), consisting of 54.11 g of water, 19.34 g of acrylic acid (90%) and 7.02 g of hydroxypropyl acrylate (96%), was added to solution A over a period of 15 min in the glass reactor. Furthermore, 1.74 g of 3-mercaplopropionic acid were added to the reactor. A 3rd solution (solution C), consisting of 3 g of sodium hydroxymethanesulphinate dihydrate and 47 g of water, was prepared. Thereafter, 46.5 mg of iron(II) sulphate heptahydrate, dissolved in a few drops of water, and 2.87 g of 30% strength hydrogen peroxide solution were added to solution A at a temperature of 16° C. Furthermore, the still remaining solution B was metered into solution A over 45 minutes and solution C was metered into solution A over 60 minutes. Finally~21 ml of 20% strength sodium hydroxide solution were added and a pH of 6.5 was established.

The aqueous solution of a copolymer having an average molecular weight of Mw=24 500 g/mol, a polydispersity of 1.66 and a solids content of 44.3% was obtained. The yield of polymer in comparison with unsaturated alcohol ethoxylate not incorporated in the following polymerized units was 95% (determined by gel permeation chromatography, referred to below as GPC).

Preparation Example 2

(Ex. 2)—Copolymer Type 2 According to the Invention

A glass reactor equipped with a plurality of feed possibilities, stirrer and dropping funnel was loaded with 87 ml of water, 37.5 g of macromonomer 1 (prepared by ethoxylation of 3-methyl-3-buten-1-ol with 11 mol of EO) and 82.5 g of macromonomer 2 (prepared by ethoxylation of 3-methyl-3-buten-1-ol with 22 mol of EO) (solution A) and thermostatted at 14° C. A portion of a second prepared, partly neutralized solution (solution B), consisting of 58.9 g of water, 16.6 g of acrylic acid (90%) and 11.7 g of hydroxypropyl acrylate (96%), was added to solution A over a period of 15 min in the glass reactor. The remaining residue was supplemented with 0.96 g of 3-mercaptopropionic acid. Furthermore, 1.92 g of 3-mercaptopropionic acid were added to the reactor. A 3rd solution (solution C), consisting of 3 g of sodium hydroxymethanesulphinate dihydrate and 47 g of water, was prepared. Thereafter, 46.5 mg of iron(II) sulphate heptahydrate, dissolved in a few drops of water, and 2.87 g of 30% strength hydrogen peroxide solution were added to solution A at a temperature of 14° C. Furthermore, the still remaining solution 8 was metered into solution A over 45 minutes and solution C was metered into solution A over 60 minutes. Finally 16.5 g of 20% strength sodium hydroxide solution were added and a pH of 6.5 was established. An aqueous solution of a copolymer having an average molecular weight of Mw=23 000 g/mol, a polydispersity of 1.86 and a solids content of 43.6% was obtained. The yield of polymer in comparison with unsaturated alcohol ethoxylate not incorporated in the following polymerized units was 97.7% (determined by GPC).

Comparative Example 1

(Comp. 1)—Corresponding to Copolymer Type 1

Commercial concrete superplasticizer Glenium® Sky 593 (from BASF Construction Polymers GmbH) based on a copolymer of vinyloxybutylenepoly(ethylene glycol), an ethylenically unsaturated carboxylic acid and an ethylenically unsaturated carboxylic acid derivative—the polymer according to Comparative Example 1 has a closely related polymer architecture in comparison with copolymer type 1.

Comparative Example 2

(Comp. 2)—Corresponding to Copolymer Type 2

Commercial concrete superplasticizer Glenium® Sky 594 (from BASF Construction Polymers GmbH) based on a copolymer of vinyloxybutylenepoly(ethylene glycol), an ethylenically unsaturated carboxylic acid and an ethylenically unsaturated carboxylic acid derivative—the polymer according to Comparative Example 2 has a closely related polymer architecture in comparison with copolymer type 2.

First the polymerization behaviour in relation to the achieved molecular weight distribution and conversion is to be considered. Table 1 shows that the preparation of the polymers according to the invention takes place with in each case somewhat higher conversions than those of the comparative polymers. A further important criterion for good performance in the concrete is the average molar mass of the polymers.

TABLE 1

Molar masses and conversions of the copolymers

| Polymer according to | $M_w$ [g/mol] | Pd | Conversion (%) |
|---|---|---|---|
| Ex. 1 | 24500 | 1.66 | 95 |
| Comp. 1 | 23200 | 1.67 | 90 |
| Ex. 2 | 23000 | 1.86 | 98 |
| Comp. 2 | 22800 | 1.68 | 94 |

Table 1 shows in each case the values for $M_w$ and for the polydispersity (Pd). Both products according to the invention have an average molar mass in the range of the comparative polymers. The polydispersities are likewise in a comparative range.

For further evaluation of the copolymers, concrete tests were carried out. The experimental procedures are described in Use Examples 1 and 2. In the tests, it was intended to check whether the copolymers according to the invention showed a good performance, i.e. the same plasticization and the same slump over time, under the same test conditions (w/c value, temperature, aggregates, etc.) and in the same dose.

Carrying Out the Concrete Tests:

280 kg of Portland cement (CEM I 42.5 R, Mergelstetten) were stirred with round aggregates having a composition, according to the Fuller screening curve, at a maximum particle size of 16 mm, 80 kg of limestone powder filler Calcit MS 12 and 156.8 kg of water, which contained the products according to the invention or the comparative products in dissolved form. Immediately after the preparation of the concrete mix, the determination of the slump and the change thereof as a function of time over a period of 60 minutes was effected.

The results of the test are shown in the tables below.

280 kg of Portland cement (CEM I 42.5 R, Karlstadt) were stirred with round aggregates having a composition, according to the Fuller screening curve, at a maximum particle size of 16 mm, 80 kg of limestone powder filler Calcit MS 12 and 162.4 kg of water, which contained the products according to the invention or the comparative products in dissolved form. Immediately after the preparation of the concrete mix, the determination of the slump and the change thereof as a function of time over a period of 60 minutes was effected.

The results are shown in the tables below.

TABLE 2

| Admixture | Solid [% by weight] | Dose [% by weight] | Slump in cm after | | | |
|---|---|---|---|---|---|---|
| | | | 0 min. | 10 min. | 30 min. | 60 min. |
| Ex. 1 | 30 | 0.18 | 64.5 | 61 | 58 | 54.5 |
| Comp. 1 | 30 | 0.18 | 64 | 60 | 57 | 54 |
| Ex. 2 | 30 | 0.18 | 60 | 59 | 55.5 | 54 |
| Comp. 2 | 30 | 0.18 | 62 | 59 | 56 | 54.5 | w/c = 0.56, cement: Mergelstetten

Table 2 shows the results of the concrete tests using Mergelstetten cement. For both example polymers, virtually identical plasticization can be observed at the same dose. In addition, like the comparative polymers, they can keep the slump virtually constant over 60 minutes. The test using Karlstadt cement also shows virtually identical behaviour of the example polymers with their references (Table 3).

TABLE 3

| Admixture | Solid [% by weight] | Dose [% by weight] | Slump in cm after | | | |
|---|---|---|---|---|---|---|
| | | | 0 min. | 10 min. | 30 min. | 60 min. |
| Ex. 1 | 30 | 0.18 | 55 | 57 | 57 | 55 |
| Comp. 1 | 30 | 0.18 | 57 | 58 | 58 | 56 |
| Ex.2 | 30 | 0.18 | 58.5 | 61 | 60.5 | 59 |
| Comp. 2 | 30 | 0.18 | 58.5 | 60 | 61.5 | 59.5 | w/c = 0.58 for Example 1 and 0.63 for Example 2; cement: Karlstadt

The results show that the copolymers according to the invention have properties comparable to the known high-performance superplasticizers with regard to their behaviour in concrete. In addition, the robustness/universality of the copolymers according to the invention is also confirmed by the use of different cements.

TABLE 4

| Admixture | Solid [% by weight] | Dose [% by weight] | Slump-flow in cm after | | | |
|---|---|---|---|---|---|---|
| | | | 0 min. | 10 min. | 30 min. | 60 min. |
| Ex. 1 | 30 | 0.18 | 44 | 42 | 35.5 | 32 |
| Comp. 1 | 30 | 0.18 | 44.5 | 41.5 | 34 | 29.5 | w/c = 0.56; cement: Mergelstetten

Table 4 shows the results for the slump-flow on the basis of Example 1 and the corresponding comparative polymer. With use of the same dose, comparable behaviour is observable here, too. This is further confirmation that the addition of the copolymers according to the invention results in a concrete which has a comparable consistency and just as good processability as is the case with the use of the high-performance superplasticizers successfully employed as a reference.

Overall conclusion from the results of the comparative experiments:

The above experiments show that the quality of the superplasticizers based on the copolymers according to the invention is outstanding. The performance is comparable with the vinyloxybutylenepoly(ethylene glycol)-based high-performance polymers which have already proved their worth in practice.

The invention claimed is:
1. Copolymer comprising
i) 30-45 mol % of an isoprenol polyether derivative structural unit α,
ii) 35-60 mol % of an acrylic acid derivative structural unit β and
iii) 6-23 mol % of a hydroxyalkyl acrylate structural unit γ, the isoprenol polyether derivative structural unit α being represented by the following general formula (Ia)

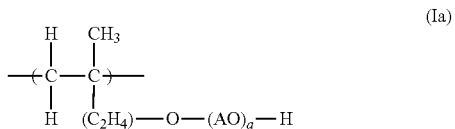

where
A is identical or different and is represented by an alkylene group according to $C_xH_{2x}$ where x=2, 3, 4 or 5,
a is identical or different and is represented by an integer between 5 and 45,
the acrylic acid derivative structural unit β being represented by the following general formulae (IIa) and/or (IIb)

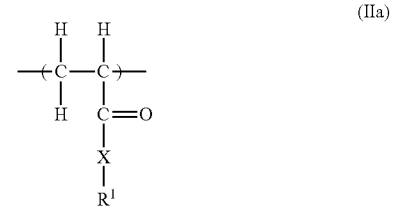

where
X is identical or different and is represented by NH—$(C_nH_{2n})$ where n=1, 2, 3 or 4 or represented by O—$(C_nH_{2n})$ where n=1, 2, 3 or 4;
$R^1$ is identical or different and is represented by $SO_3H$, $PO_3H_2$, $OPO_3H_2$ and/or $C_6H_5$—$SO_3H$

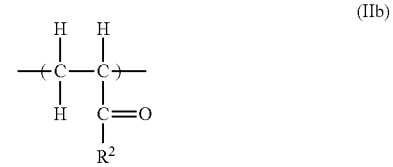

where
$R^2$ is identical or different and is represented by OH, OM where M=Na, K, or Ca, and/or $ONH_4$ and the hydroxyalkyl acrylate structural unit γ being represented by the following general formula (III)

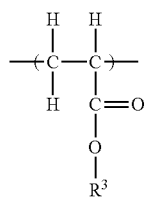 (III)

where
R³ is identical or different and is represented by a branched or straight-chain $C_1$-$C_5$ monohydroxyalkyl group.

2. The Copolymer according to claim 1, wherein in the general formula (Ia) representing the isoprenol polyether derivative structural unit α, x is represented by 2 and/or 3.

3. The Copolymer according to claim 1, wherein in the general formula (Ia) representing the isoprenol polyether derivative structural unit α, a=6 to 15 for at least 20 mol % of all $(AO)_a$ side chain segments, and a=19 to 35 for a further at least 20 mol % of all $(AO)_a$ side chain segments.

4. The Copolymer according to claim 1, wherein the acrylic acid derivative structural unit β is represented by the general formula (IIb).

5. The Copolymer according to claim 4, wherein the acrylic acid derivative structural unit β is represented by the general formula (IIb) and R² is represented by OH.

6. The Copolymer according to claim 1, wherein in the hydroxyalkyl acrylate structural unit γ which is represented by the general formula (III), R³ is represented by —CH₂—CHOH—CH₃, —CHCH₃—CH₂—OH and/or —CH₂—CH₂—OH.

7. The Copolymer according to claim 1, having a weight-average molecular weight of 10 000 to 100 000.

8. The Copolymer according to claim 1, which is present in aqueous solution which contains 30 to 95% by weight of water and 5 to 70% by weight of dissolved dry matter.

9. The Copolymer according to claim 1, which, in addition to the isoprenol polyether derivative structural unit u, the acrylic acid derivative structural unit β and the hydroxyalkyl acrylate structural unit γ, also has at least one further structural unit.

10. A process of preparing a copolymer according to claim 1 comprising a free radical solution polymerization at 0 to 40° C. in the presence of a redox initiator and water.

11. A building material mixture comprising a copolymer according to claim 1 and a hydraulic binder and/or a latently hydraulic binder.

12. The building material mixture according to claim 11, wherein the hydraulic binder is present as cement, lime, hemihydrate, anhydrite or gypsum.

13. The building material mixture according to claim 11, wherein the latently hydraulic binder is present as fly ash, trass or blast furnace slag.

14. The Copolymer according to claim 1, wherein in the general formula (Ia) representing the isoprenol polyether derivative structural unit α, a=6 to 15 for at least 35 mol % of all $(AO)_a$ side chain segments and a=19 to 35 for a further at least 35 mol % of all $(AO)_a$ side chain segments.

15. The Copolymer according to claim 1, wherein the acrylic acid derivative structural unit β is present in a relative proportion of 40 to 55 mol %.

16. Copolymer comprising
i) 5 to 55 mol % of an isoprenol polyether derivative structural unit α,
ii) 2 to 90 mol % of an acrylic acid derivative structural unit β,
iii) 2 to 90 mol % of a hydroxyalkyl acrylate structural unit γ, and
iv) at least 1 mol % of an isoprenol structural unit α;
the isoprenol polyether derivative structural unit a being represented by the following general formula (Ia)

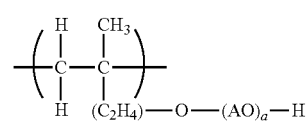 (Ia)

where
A is identical or different and is represented by an alkylene group according to $C_xH_{2x}$ where x=2, 3, 4 or 5,
a is identical or different and is represented by an integer between 5 and 45;
the acrylic acid derivative structural unit β being represented by the following general formulae (IIa) and/or (IIb)

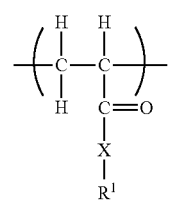 (IIa)

where
X is identical or different and is represented by NH—$(C_nH_{2n})$ where n=1, 2, 3 or 4 or represented by O—$(C_nH_{2n})$ where n=1, 2, 3 or 4.
R¹ is identical or different and is represented by $SO_3H$, $PO_3H_2$, $OPO_3H_2$ and/or $C_6H_5$—$SO_3H$;

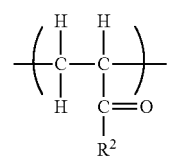 (IIb)

where
R² is identical or different and is represented by OH, OM where M=Na, K, or Ca, and/or $ONH_4$;
and the hydroxyalkyl acrylate structural unit γ being represented by the following general formula (III)

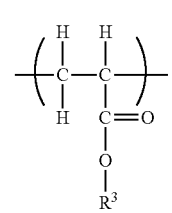 (III)

where
R³ is identical or different and is represented by a branched or straight-chain $C_1$-$C_5$ monohydroxyalkyl group;

the isoprenol structural unit α' being represented by the general formula (IVa)
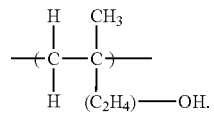
(IVa)

UNITED STATES PATENT AND TRADEMARK OFFICE
CERTIFICATE OF CORRECTION

| | |
|---|---|
| PATENT NO. | : 8,519,030 B2 |
| APPLICATION NO. | : 12/866998 |
| DATED | : August 27, 2013 |
| INVENTOR(S) | : Lorenz et al. |

It is certified that error appears in the above-identified patent and that said Letters Patent is hereby corrected as shown below:

In the Claims:

In column 9, claim 9; structural unit "u" is incorrect. Claim 9 should read "The Copolymer according to claim 1, which, in addition to the isoprenol polyether derivative structural unit α...."

In column 10, claim 16; isoprenol structural unit "α" and isoprenol polyether derivative structural unit "a" are both incorrect. "Claim 16 at column 10, lines 5-7 should read "iv) at least 1 mol % of an isoprenol structural unit α'; the isoprenol polyether derivative structural unit α being represented by the following general formula (Ia)...."

Signed and Sealed this
Nineteenth Day of November, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,519,030 B2
APPLICATION NO. : 12/866998
DATED : August 27, 2013
INVENTOR(S) : Lorenz et al.

It is certified that error appears in the above-identified patent and that said Letters Patent is hereby corrected as shown below:

In the Claims:

In column 9, lines 41-42, claim 9; structural unit "u" is incorrect. Claim 9 should read "The Copolymer according to claim 1, which, in addition to the isoprenol polyether derivative structural unit $\alpha$...."

In column 10, claim 16; isoprenol structural unit "$\alpha$" and isoprenol polyether derivative structural unit "a" are both incorrect. Claim 16 at column 10, lines 5-7 should read "iv) at least 1 mol % of an isoprenol structural unit $\alpha'$; the isoprenol polyether derivative structural unit $\alpha$ being represented by the following general formula (Ia)...."

This certificate supersedes the Certificate of Correction issued November 19, 2013.

Signed and Sealed this
Tenth Day of December, 2013

Margaret A. Focarino
*Commissioner for Patents of the United States Patent and Trademark Office*